F. A. ELLIS, Jr.
WHEEL.
APPLICATION FILED FEB. 27, 1914.

1,169,944.

Patented Feb. 1, 1916.

Inventor.
Frederick Arthur Ellis, Jnr.,
BY Wm Wallace White ATT'Y.

UNITED STATES PATENT OFFICE.

FREDERICK ARTHUR ELLIS, JR., OF BIRMINGHAM, ENGLAND.

WHEEL.

1,169,944.  Specification of Letters Patent.  Patented Feb. 1, 1916.

Application filed February 27, 1914. Serial No. 821,417.

*To all whom it may concern:*

Be it known that I, FREDERICK ARTHUR ELLIS, Jr, a subject of the King of Great Britain, residing at Birmingham, in the county of Warwick, England, engineer, have invented new and useful Improvements in Wheels, of which the following is a specification.

The improvements which form the subject of this invention are more especially applicable to wheels for automobiles and other vehicles, but may be also applied to driving pulleys, and wheels for a great variety of other purposes. And in order that my invention may be clearly understood I will proceed to describe the same as applied to the construction of an automobile wheel.

Figure 1:
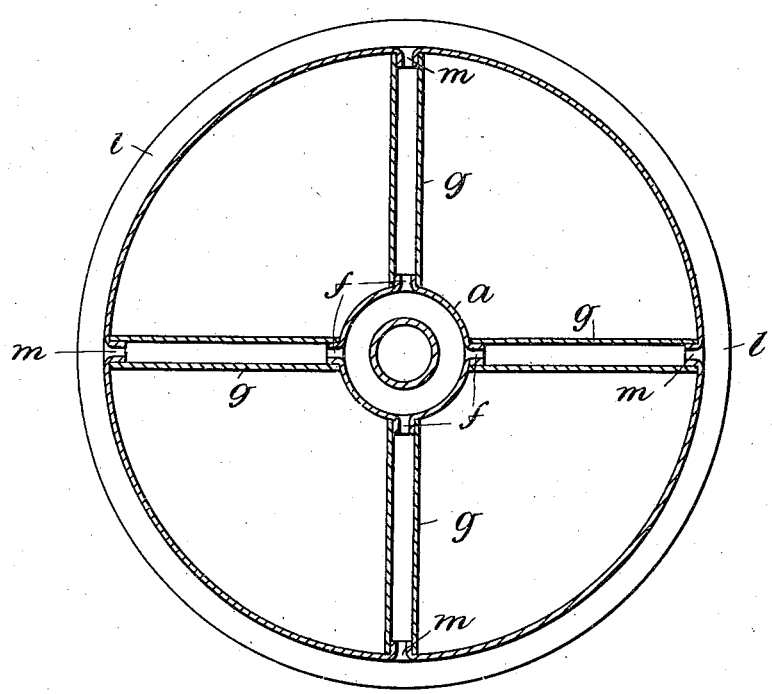
Figure 2:
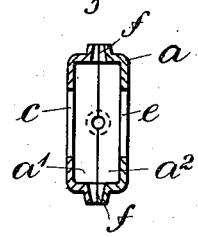

In the accompanying drawing Figure 1 illustrates diagrammatically in vertical section a wheel constructed in accordance with my invention. Fig. 2 is a section through the hollow boss or hub of the wheel.

Similar letters of reference relate to like parts in all the figures of the drawings.

In accordance with my invention I form the hollow boss or hub of the wheel by pressing or stamping the same from a metal plate of suitable thickness according to the strength required, and the purpose for which the vehicle to which it is to be applied is to be used. For example I may form the hollow boss or hub $a$ with spigots or projections $f$ thereupon for the reception of the inner ends of the spokes $g$ in two similarly dished halves $a^1$, $a^2$ pressed or stamped from sheet metal and afterward welded together at their adjacent edges, as shown in Fig. 2, and one half of each spigot or projection $f$ may be formed on each of the said dished halves, the holes $c$ and $e$ forming the seating for the axle-box may be stamped out when each of the halves $a^1$ and $a^2$ is formed or they may be made subsequently, if desired, in any suitable manner.

The hollow boss or hub with the inner ends of the spokes $g$ in place upon the spigots or projections $f$ thereof is placed in a central position within the metal rim $l$ (Fig. 1). A hole is pierced in the rim $l$ opposite the outer end of each spoke $g$ and each such hole is then swaged inwardly so as to form other spigots or projections $m$ upon the rim $l$ within the outer ends of the spokes $g$. The inner end of each spoke $g$ is then welded in any well known manner to the hollow boss or hub and to its corresponding spigot or projection $f$ thereupon; and the outer end of each spoke $g$ is welded to the rim $l$ and to its corresponding spigot or projection $m$ thereupon, and a light and strong wheel is thereby formed.

I claim—

A wheel comprising a hollow hub of plate metal having tubular open-ended spigots projecting radially therefrom, tubular spokes having their inner ends fitted onto the hub spigots, a one-piece, jointless rim of plate metal encompassing the outer ends of the spokes and having tubular open-ended spigots swaged inwardly therefrom into the respective spoke ends.

In testimony whereof I have signed my name to this specification in the presence of two subscribing witnesses.

FREDERICK ARTHUR ELLIS, JNR.

Witnesses:
 HUBERT WILLIAM CLARKE,
 ERNEST HARKER.